(12) United States Patent
Wissman

(10) Patent No.: US 6,668,132 B2
(45) Date of Patent: *Dec. 23, 2003

(54) RECORDING TIME EXTENSION USING A REMOTE CONTROL

(76) Inventor: Charles Henry Wissman, 5222 Shelley Pl., Carlsbad, CA (US) 92008

( * ) Notice: Subject to any disclaimer, the term of this patent is extended or adjusted under 35 U.S.C. 154(b) by 0 days.

This patent is subject to a terminal disclaimer.

(21) Appl. No.: 10/139,429

(22) Filed: May 6, 2002

(65) Prior Publication Data

US 2002/0159753 A1 Oct. 31, 2002

Related U.S. Application Data

(63) Continuation of application No. 09/268,189, filed on Mar. 15, 1999, now Pat. No. 6,415,094.
(60) Provisional application No. 60/078,174, filed on Mar. 16, 1998.

(51) Int. Cl.[7] .................................................. H04N 7/00
(52) U.S. Cl. ........................................................ 386/46
(58) Field of Search ............................. 386/46, 117, 95; 348/143, 715, 706, 734; H04N 5/91

(56) References Cited

U.S. PATENT DOCUMENTS 6,415,094 B1 * 7/2002 Wissman ...................... 386/46

* cited by examiner

Primary Examiner—Vincent Boccio

(57) ABSTRACT

A remote control is used to extend the recording time of a recording device (typically a camcorder (20)). The remote control periodically commands the camcorder (20) to record for a relatively short period of time and then stop recording. In this way, the camcorder (20) is caused to record in a time-lapse fashion. Also, the remote control is used to disable all recording for periods of time when it is known that an event of interest will not occur during these periods. Provisions are made for extending both the recording tape time and the camcorder battery (34) life.

17 Claims, 9 Drawing Sheets

RECORDING TIME EXTENSION USING A REMOTE CONTROL

BACKGROUND—CROSS-REFERENCES TO RELATED APPLICATIONS

This application is continuation of Ser. No. 09/268,189, filed Mar. 15, 1999 now U.S. Pat. No. 6,415,094 and claims the benefits of Provisional Patent Application Ser. No. 60/078,174, filed Mar. 16, 1998 and Disclosure Document Ser. No. 426605, filed Oct. 30, 1997.

BACKGROUND—FIELD OF INVENTION

The present invention relates to extended unattended video recording and to remote control devices. The invention addresses the need to monitor a location or process unattended for an extended period of time—typically much greater than the time capacity of a standard recording tape.

BACKGROUND—DESCRIPTION OF PRIOR ART

One technique for efficient extended recording is time lapse recording. Time lapse recording enables reproduction in less than the actual time period. For example, in reproducing a weather radar picture occurring over an extended period, say twenty-four hours, the recorder is operative to record the radar screen only at spaced time intervals; and, the recordings or takes are successive on the recorded tape for playback in continuous sequence. By way of example, if a videotape recorder were actuated to record every five minutes for a period of five seconds then there would be recorded one minute for each hour. In this example, there is a time compression of 60 to 1. Of course, these rates and periods may be selected, as desired.

There are prior art devices for extended recording. The most well known of these that use time-lapse recording techniques are time lapse videocassette recorders. These are highly specialized, expensive devices. They do not have an integrated video camera and most often must be permanently installed at the location to be monitored.

Scott U.S. Pat. No. 4,271,437 recognizes the advantages of adapting a more standard video-recording device to be used as a time lapse video recorder. Even the Scott device however requires a more specialized videocassette recorder than those most commonly used. It requires that the videocassette recorder it interfaces with have separate electrical inputs for play, rewind, and edit commands. Because the Scott device uses an electrical interface, it cannot be used with camcorders, which use an infrared interface. Also, because timing is set with physical components such as capacitors, the Scott device does not allow for easy changing of the time lapse parameters such as the period between video samples and the length of each sample. In addition, the Scott device requires that the recording tape be pre-recorded with control signals.

Another device commercially available uses a recording time extension method different than time-lapse recording. This device receives signals from a motion detector. When motion is detected, the device sends a record command to a video cassette recorder through an infrared signal. A period of time after the motion signal is detected, the device sends an infrared command to stop recording. In this way, the video cassette recorder is recording only when there is activity of interest—presumably when people or animals are moving in the range of the motion detector. One obvious limitation of this device is that it is limited to recording events that can be detected by a motion detector. Among these limitations are:

The event must include a moving object.

The moving object must radiate heat.

The moving object must be close to the motion detector.

A window cannot separate the moving object and the motion detector. The glass will block the heat radiation given off by the moving object. Also, the amount of time compression is set by the event being monitored and is therefore unpredictable. In other words, if the motion detector is constantly being triggered, the recording tape time will be consumed more quickly than if there is less motion.

There is much prior art regarding remote control devices. Most of the prior art is concerned with methods of controlling as many devices as possible with a single remote control. This includes efficient storage of a large number of command sets in the limited memory of a microprocessor and efficient recall of these command sets. Examples of this are: Wells II U.S. Pat. No. 4,623,887, Rumbolt et al U.S. Pat. No. 4,703,359, and Hayes et al U.S. Pat. No. 5,614,906. These devices are concerned with immediate user control of a consumer device such as a TV, videocassette recorders, or a cable TV converter box. These are not concerned with controlling devices unattended.

OBJECTS AND ADVANTAGES

It is an important object of the present invention to provide a method and apparatus to allow for unattended video recording over extended periods of time using standard video recording devices. Several objects and advantages of the present invention are:

It is much less expensive.

It is much more self-contained and portable.

Recording parameters can be varied much easier.

It is not confined to events that can be detected by a motion detector.

The amount of extended recording time is predictable.

It takes advantage of new advances in recording technology that are generally incorporated into mass-produced consumer products first.

The benefits of the present invention become most apparent when used in conjunction with a camcorder and for the most part will be described for use with a camcorder. Other video recording devices such as videocassette recorders can also be used. Also, the present invention is described with a remote control that uses infrared energy as its transmitting media, though any wireless media could be used.

SUMMARY

Personal video recording devices, commonly known as "camcorders" include within them high quality optics, precise electromechanical systems for auto-focusing, sensitive high resolution electro-optic sensors, and the means to store a large amount of video information on inexpensive magnetic tape. Most also have the capability of noting the time and date a recording was taken. Because of mass production, camcorders are quite inexpensive given the amount of technology that goes into them. The main problem with using a camcorder for extended unattended monitoring is the limited recording time of the recording tape (typically 2 hours). A practical device would have a capability of at least 24 hours.

To extend the recording time of a camcorder, a remote control is used to control the recording intervals of the camcorder. One of the most powerful recording time-extending techniques is time lapse recording. For time lapse recording, a remote control is used to periodically command the camcorder to record for relatively short periods of time and then stop recording. In other words, periodically take video samples. Most camcorders can be remotely controlled by infrared (or other wireless) signals. The new extended time is given by the formula:

$$\text{Text} = T\text{norm} * [(T\text{standby}/T\text{record}) + 1] \quad \text{Equation 1}$$

$$\text{Time Compression} = \text{Text}/T\text{norm} = (T\text{standby}/T\text{record}) + 1 \quad \text{Equation 2}$$

Where:

Text=The new extended time

Tnorm=The normal recording time

Trecord=The time the camcorder is recording during each video sample. In other words, the time lapse record interval.

Tstandby=The time the camcorder is not recording between each video sample. In other words, the time lapse standby interval.

In this way, a standard camcorder can be used to video monitor a location or process unattended for an extended period of time—typically much greater than the time capacity of a standard recording tape. The sample time and the time between samples would be adjusted depending on the nature of the event to be captured and the total monitoring time required. Another way to extend the recording time is to completely disable the recording during periods of time when an event of interest is known not to occur or cannot be recorded. For example, if there were no artificial lighting at all, it would not make sense to record at night.

Another way would be to combine the technique of using a sensor such as a motion detector to modify the time-lapse recording when a special event occurs.

In cases where there is no AC power available, battery energy can limit the recording time even more so than tape capacity. Although most camcorders can be remotely commanded to start and stop recording, they cannot be remotely commanded to turn themselves completely off. Even when not recording, and in a "stand by" mode, most camcorders draw significant power from their power source. In this case, an infrared (or other wireless) controlled switch that is sensitive to commands from the remote control can be placed in series with the camcorder battery. This infrared controlled switch would switch power off and on from the battery to the camcorder based on commands from the remote control in the same way the tape recording is enabled and disabled. In this way the battery lifetime can be extended by the same techniques as the taping time is extended.

DRAWING FIGURES

Figure 4A:
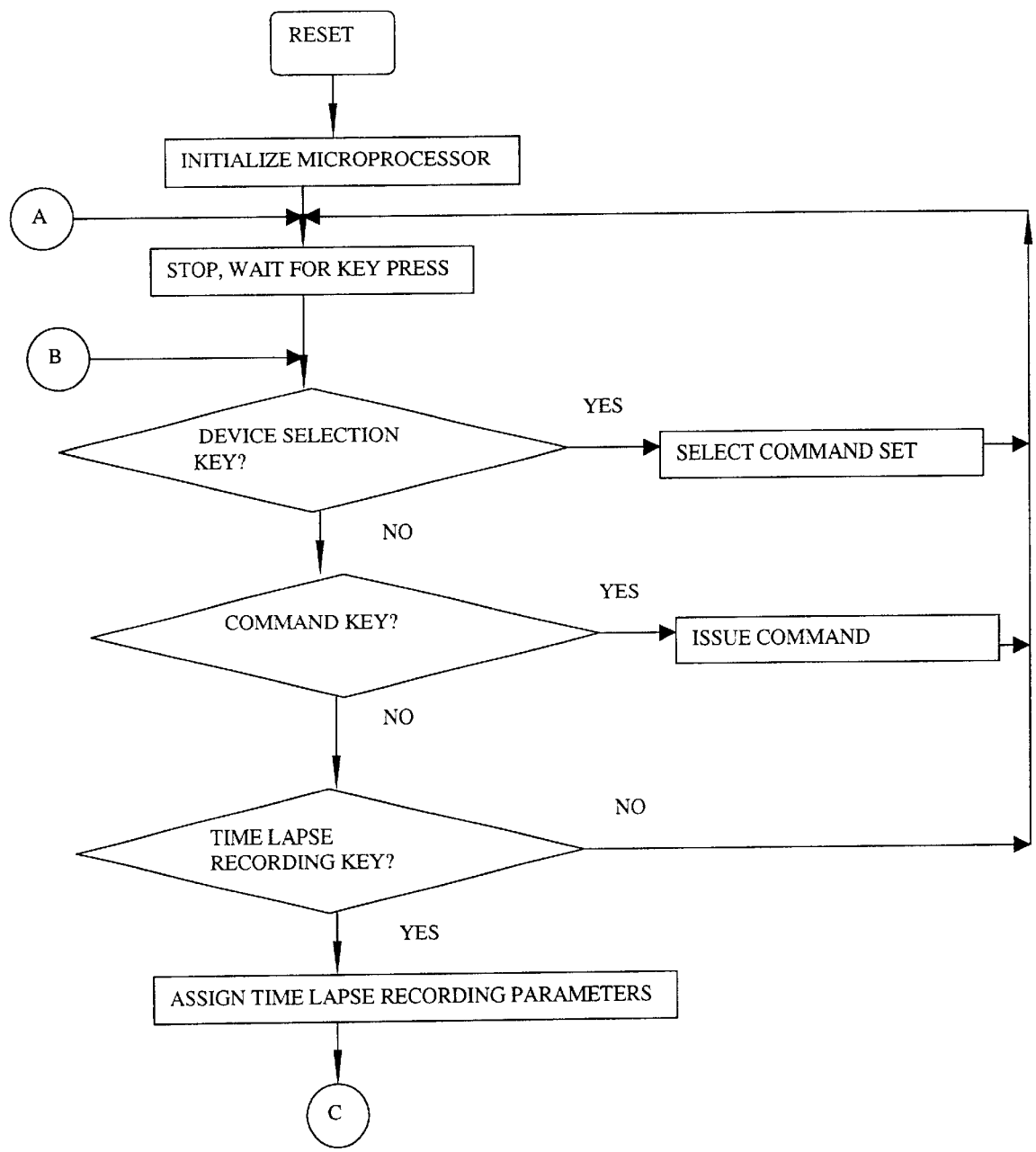
Figure 4B:
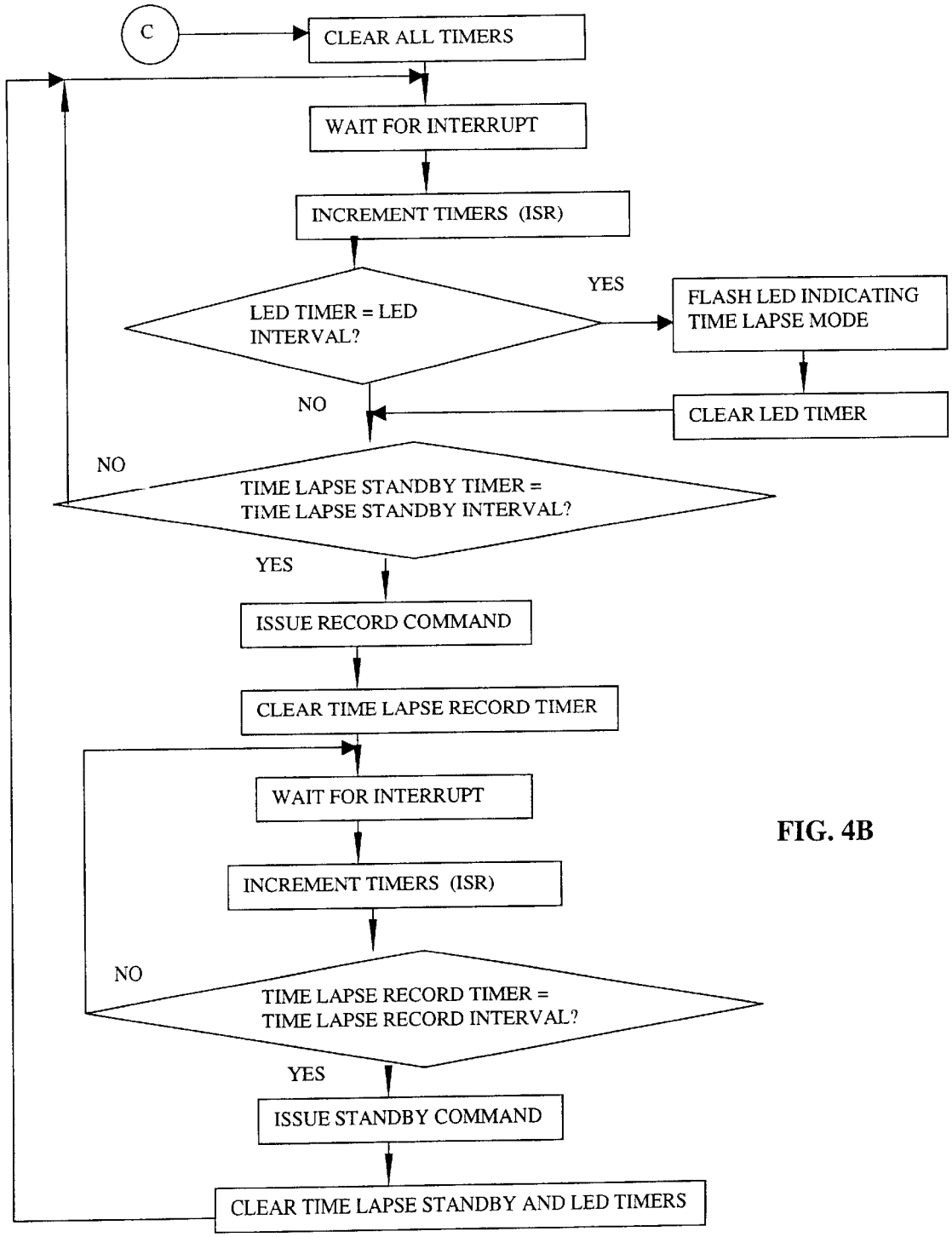

FIGS. 4A, and 4B are each portions of a flow chart that together provide a program for control of the remote control to provide the appropriate infrared signals (commands) to send to a camcorder so as to cause the camcorder to record in a time lapse fashion.

FIGS. 5A, 5B, 5C, and 5D are each portions of a flow chart that together provide a program for control of the remote control to provide the appropriate infrared (or other wireless) signals (commands) to send to a camcorder so as to cause the camcorder to record in a time lapse fashion. In addition, the program allows all recording to be disabled for periods of time and to rewind the tape when the end of the tape is detected.

Figure 1:
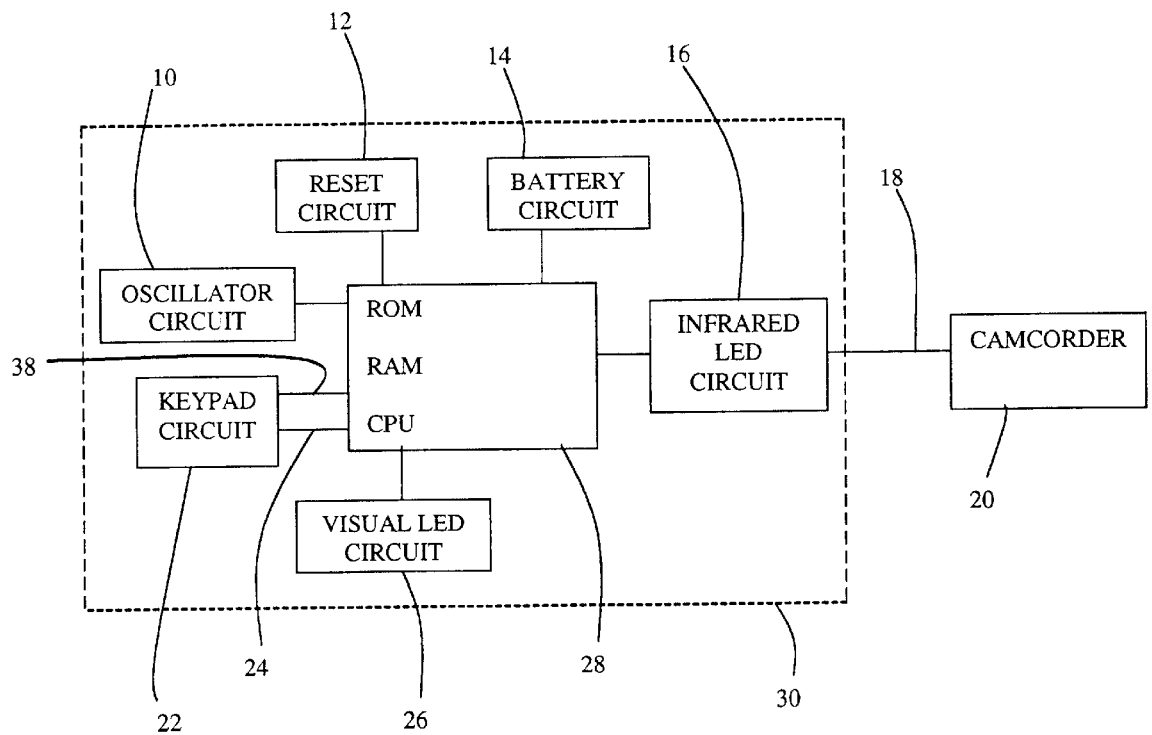
FIG. 1 is a block electrical schematic diagram of the remote control along with a camcorder being controlled.
Figure 2:
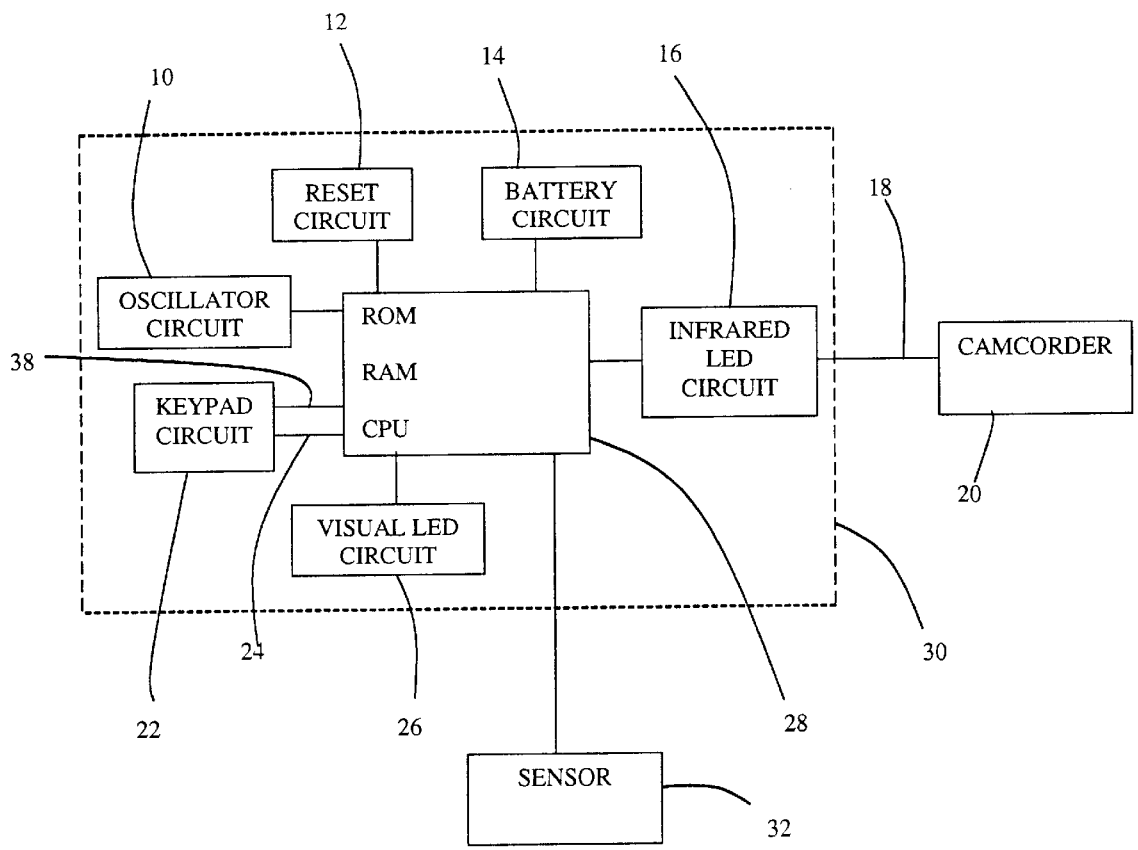
FIG. 2 is a block electrical schematic diagram of the remote control used with an external sensor along with a camcorder being controlled.
Figure 3:
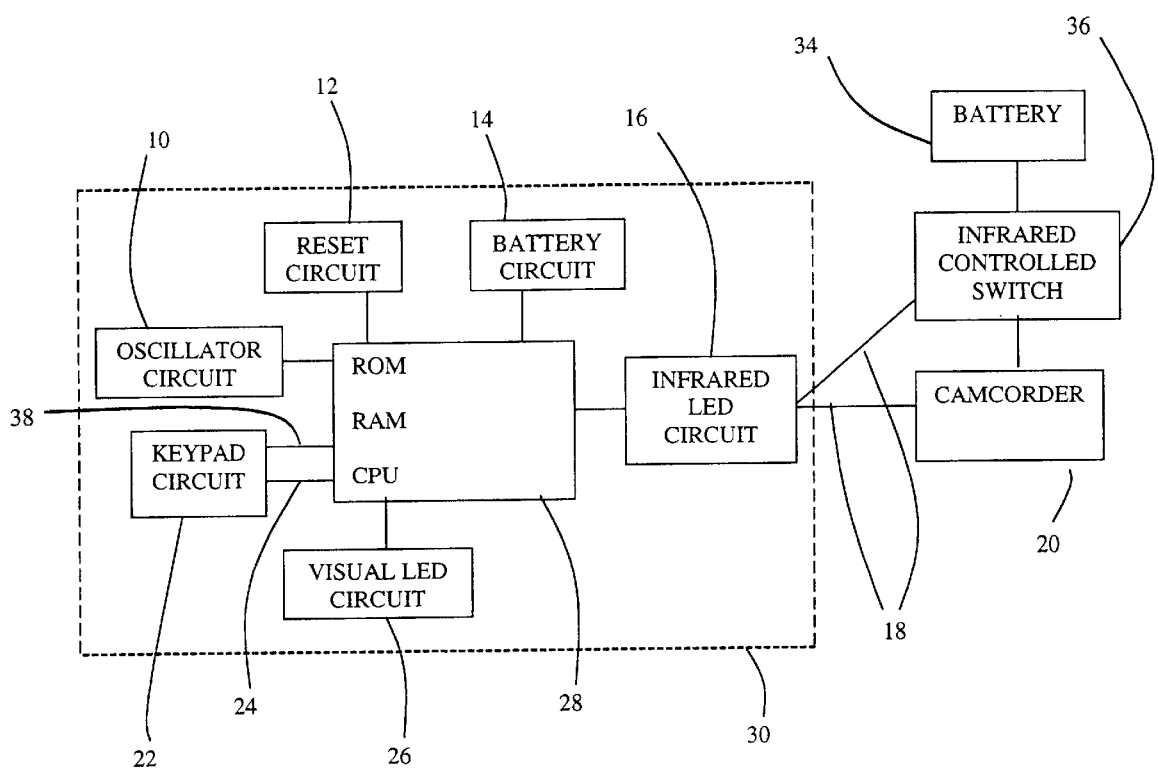
FIG. 3 is a block diagram of a recording system when no AC power is available.

Reference Numerals in Drawings 10 crystal oscillator circuit
12 reset circuit
14 battery circuit
16 infrared LED circuit
18 infrared signal
20 camcorder
22 keypad circuit
24 interrupt line
26 visual LED circuit
28 microprocessor
30 remote control
32 sensor
34 battery
36 infrared controlled switch
38 bus DESCRIPTION—FIGS. 1 to 3

Referring now to the drawings in greater detail, there is illustrated in FIG. 1 a block electrical schematic diagram of the remote control 30, which includes a microprocessor 28. A crystal oscillator circuit 10 provides a clock frequency for the microprocessor 28. A keypad circuit 22 is coupled to the microprocessor 28 through a bus 38 and an interrupt line 24. A reset circuit 12 is coupled to the microprocessor 28. A battery circuit 16 is coupled to the microprocessor 28. To indicate status, a visual LED circuit 26 is coupled to and controlled by the microprocessor 28. An infrared LED circuit 16 is coupled to and controlled by the microprocessor 28. The infrared LED circuit 16 emits an infrared signal 18, which is received by a camcorder 20. The electrical circuitry of the remote control 30 is generally of the type disclosed in greater detail in the Darbee et al U.S. Pat. No. 4,959,810.

FIG. 2 is the same as FIG. 1 except a sensor 32 is coupled to the microprocessor 28 contained in the remote control 30. The sensor 32 allows the program running in the microprocessor 28 to modify its operation when the sensor 32 detects certain events. Examples of sensor 32 would be a motion detector, a microphone, or a light sensor.

FIG. 3 is the same as FIG. 1 except a battery 34 supplies power for the camcorder 20 through an infrared controlled switch 36. This configuration is useful in applications where no AC power is available. In response to the infrared signal 18 from the remote control 30, the infrared controlled switch 36 connects the battery 34 to the camcorder 20 when recording is required. The infrared controlled switch 36 disconnects the battery 34 from the camcorder 20 when recording is not required. In this way, the life of the battery 34 is extended by the same techniques as used for extending the tape time. An infrared receiver contained within the infrared controlled switch 36 can be of the same type that is contained within the camcorder 20, the design of which is well known. The infrared controlled switch 36 would be constantly powered by the battery 34 so as to be ready to receive the infrared signal 18 at any time. However, the infrared controlled switch 36 consumes very little power in comparison to the camcorder 20. In operation, the remote control 30 sends the infrared signal 18 to command the infrared controlled switch 36 to connect the battery 34 to the camcorder 20 a few seconds before commanding the camcorder 20 to start recording. This is to allow the camcorder 20 time to power up before receiving any commands. After commanding the camcorder 20 to stop recording, the remote control 30 commands the infrared controlled switch 36 to disconnect the battery 34 from the camcorder 20.

Operation—FIGS. 4A and 4B

FIGS. 4A, and 4B are each portions of a flow chart that together provide a program for control of the remote control 30 to provide the appropriate infrared signals (commands) to send to the camcorder 20 so as to cause the camcorder 20 to record in a time lapse fashion.

FIG. 4A shows the starting point of the program to be executed by the microprocessor 28 in controlling the remote control 30. The flow chart begins with reset to the microprocessor 28. This happens when batteries are first installed in the remote control 30. Internal registers are initialized that control the microprocessor operation. This includes setting the data direction of the microprocessor ports (input or output) and setting up the microprocessor interrupts. The program then instructs the microprocessor 28 to go into a low power stop mode. All microprocessor functions are stopped, including all internal clocks. The contents of the internal RAM are retained in this mode. The stop mode is used to conserve the battery power of the remote control 30 when not in use. Only when an interrupt is generated from a key press will the microprocessor 28 emerge from this mode. The stop mode is provided in the MC68HC705C8A microprocessor made by Motorola. Microprocessors made by other manufactures have a similar mode.

When a key is pressed, the program determines which key has been pressed through a standard keypad scan routine. If the key pressed indicates that the operator wishes to select a device to control such as a particular camcorder 20, a routine is run that will select the appropriate command set. Though shown as only a single step in the FIG. 4A, this can be a relatively complex process, but is well covered by prior art. An example of a method for selecting a remote control command set is Hayes et al U.S. Pat. No. 5,614,906. Because there is a much more limited set of camcorders than devices intended to be controlled by most prior art remote controls, the device selection process can be simpler. It is also possible to simply have a different remote control 30 for each brand of camcorder 20 and eliminate the device selection set all together. Sony for example has only one command set for all its camcorders. After selecting a command set, the program instructs the microprocessor 28 to return to the stop mode.

If the key pressed is a key that indicates the operator wishes immediate control of some aspect of the camcorder 20, the program sends the command associated with the key immediately. Examples of commands that might be sent immediately include record, standby, zoom in, and zoom out. The program repeatedly sends the command until the operator releases the key. After the key is released, the program returns to the low power stop mode. Up until this point, the program is essentially the same as programs run by prior art devices.

If the key pressed does not indicate that the operator wants to operate the camcorder 20 in a time lapse fashion, select a command set, or immediately send a command, the key pressed is either unassigned or a key assigned to the off function. In this case, the program goes back into a low power stop mode without any further action.

If the key pressed indicates that the user wishes to have the camcorder 20 record in a time lapse fashion, the program assigns appropriate time lapse parameters to memory locations or registers in the microprocessor 28. One parameter is the time lapse standby interval. The time lapse standby interval is the time between video samples. It is essentially the same as Tstandby in equations 1 and 2. Another parameter is the time lapse record interval. The time lapse record interval is the length of time of each video sample. It is essentially the same as Trecord in equations 1 and 2. Depending on how much operator control is desirable, these parameters can be assigned through a single key press or a series of key presses. For example, pressing the "1" key can assign 45 seconds to the time lapse standby interval and 5 seconds for the time lapse record interval, giving a time compression ratio of 10, or the operator may enter 45 and 5.

After the time lapse parameters have been assigned, the program enters a time lapse routine in FIG. 4B. At this point, it is assumed that the camcorder 20 is in a standby or non-recording mode. The program clears all registers assigned to track elapsed time. These registers are the time lapse standby timer, the time lapse record timer, and the LED timer. The program then instructs the microprocessor 28 to enter a low power wait mode. This mode is available in the MC68HC705C8A microprocessor, and other microprocessors have an equivalent mode. It is similar to the stop mode except that a timer internal to the microprocessor 28 continues to run, drawing somewhat more power than in the stop mode, but much less than when the microprocessor 28 is fully operating. The microprocessor 28 stays in this wait mode until an internal timer interrupt is generated. When the internal timer overflows, an interrupt is generated internal to the microprocessor 28, causing the microprocessor 28 to execute an interrupt service routine (ISR) and then subsequent instructions in the program. For the MC68HC705C8A microprocessor from Motorola, the internal timer is 16 bits in length and is clocked by the crystal oscillator circuit 10 divided by 8. For a crystal oscillator circuit running at 4 MHz, the timer overflows every (8/4 Mhz)*2^16, or every 0.131 seconds. Because the microprocessor 28 only needs to emerge from the low power wait mode every 0.131 seconds, the vast majority of time while running the time lapse program is spent in the low power wait mode. This is important to conserve the battery energy of the remote control 30 because it can be running the time lapse program for an extended period of time.

After emerging from the wait mode, the program increments all the timer registers. These timer registers essentially count the number of times the internal microprocessor timer has overflowed since the registers were cleared. The incrementing of the timers can be performed by the interrupt service routine (ISR). The program then checks to see if the LED timer is equal to the LED interval. If it is, the program flashes the visual LED to indicate to the operator that the time lapse program is executing, and the LED timer is cleared. The LED interval is independent of any time lapse parameters and does not have to be assigned by the user. To conserve battery energy, the LED should be flashed very briefly and infrequently. If the LED timer is not equal to the LED interval, the LED flashing steps are skipped. The program then checks to see if the time lapse standby timer is equal to the time lapse standby interval. If it is not, the program goes back to the point in the already described portion of the program where the program waits for an interrupt. If the time lapse standby timer is equal to the time lapse standby interval, the program sends a record command to the camcorder 20. For most Sony camcorders, the record command is the sequence:

on 2.4 ms, off 0.6 ms, on 1.2 ms, off 0.6 ms, on 0.6 ms, off 0.6 ms, on 0.6 ms, off 0.6 ms, off 0.6 ms, on 1.2 ms, 0.6 ms, on 1.2 ms, off 0.6 ms, on 0.6 ms, off 0.6 ms, on 0.6 ms, off 0.6 ms, on 1.2 ms, off 0.6 ms, on 0.6 ms, off 0.6 ms, on 0.6 ms, off 0.6 ms, on 1.2 ms, off 0.6 ms, on 1.2 ms, off 0.6 ms, on 1.2 ms, off 0.6 ms, on 0.6 ms, off 0.6 ms, on 1.2 ms, off 0.6 ms.

Where:
on xx ms=infrared output square wave modulated at 40 kHz for xx milliseconds.
off xx ms=no infrared output for xx milliseconds.

At this point, the camcorder 20 is recording. If the system illustrated in FIG. 3 is used, a command to cause the infrared controlled switch 36 to connect the battery 34 to the camcorder 20 would be issued a short time before the camcorder record command is issued. This step is not shown. The time lapse record timer is cleared and the program waits for an interrupt to occur. After emerging from the wait mode due to an internal timer interrupt, the program increments all timers. The program then checks to see if the time lapse record timer is equal to the time lapse record interval. If it is not, the program goes back to waiting for an interrupt. If it is, the program issues a standby command to the camcorder 20. In other words, it commands the camcorder 20 to stop recording. As an example, Sony camcorders use the same command to toggle the camcorder 20 from a recording state to a standby state, or vice versa. For a Sony camcorder, the same command described above would be issued at this point. After the command is issued, the camcorder 20 is in a standby or non-recording mode. If the system illustrated in FIG. 3 is used, a command to cause the infrared controlled switch 36 to disconnect the battery 34 from the camcorder 20 would be issued a short time after the camcorder standby command is issued. This step is not shown. The program then clears the standby and LED timer registers and returns to the beginning of the time lapse routine. The time lapse routine is repeated continuously until a key is pressed by the operator, generating a key press interrupt and causing the program to go to the "B" point in FIG. 4A.

The time lapse record interval and time lapse standby interval can be synchronized with a periodic event. As an example, the time lapse record interval and the time lapse standby interval could be set so that recording begins a few seconds before a traffic signal turns red and ends a few seconds after the traffic signal turns red. This would have obvious applications in traffic enforcement.

If the system in FIG. 2 is used, the time lapse standby interval and the time lapse record interval can be modified in response to an input from the sensor 32. One modification would be to increase the time lapse record interval and decrease the time lapse standby interval in response to an input from the sensor 32. This would cause the recording tape to be consumed more quickly, however it would increase the chance of capturing an event detected by the sensor 32. The sensor 32 could also be used to aid in synchronizing the time lapse record interval and the time lapse standby interval to record periodic events. The steps for this modification are not shown.

To summarize, the program in FIGS. 4A and 4B causes the camcorder 20 to record in a time lapse fashion. The time length of the video samples is equal to the time lapse record interval. The time between video samples is equal to the time lapse record interval.

Operations—FIGS. 5A, 5B, 5C, and 5D

FIGS. 5A, 5B, 5C, and 5D are each portions of a flow chart that together provide a program for control of the remote control 30 to provide the appropriate infrared control signals (commands) to send to the camcorder 20 so as to cause the camcorder 20 to record in a time lapse fashion. In addition, the program allows all recording to be disabled for periods of time and to rewind the recording tape when the end of the tape is detected.

Figure 5A:
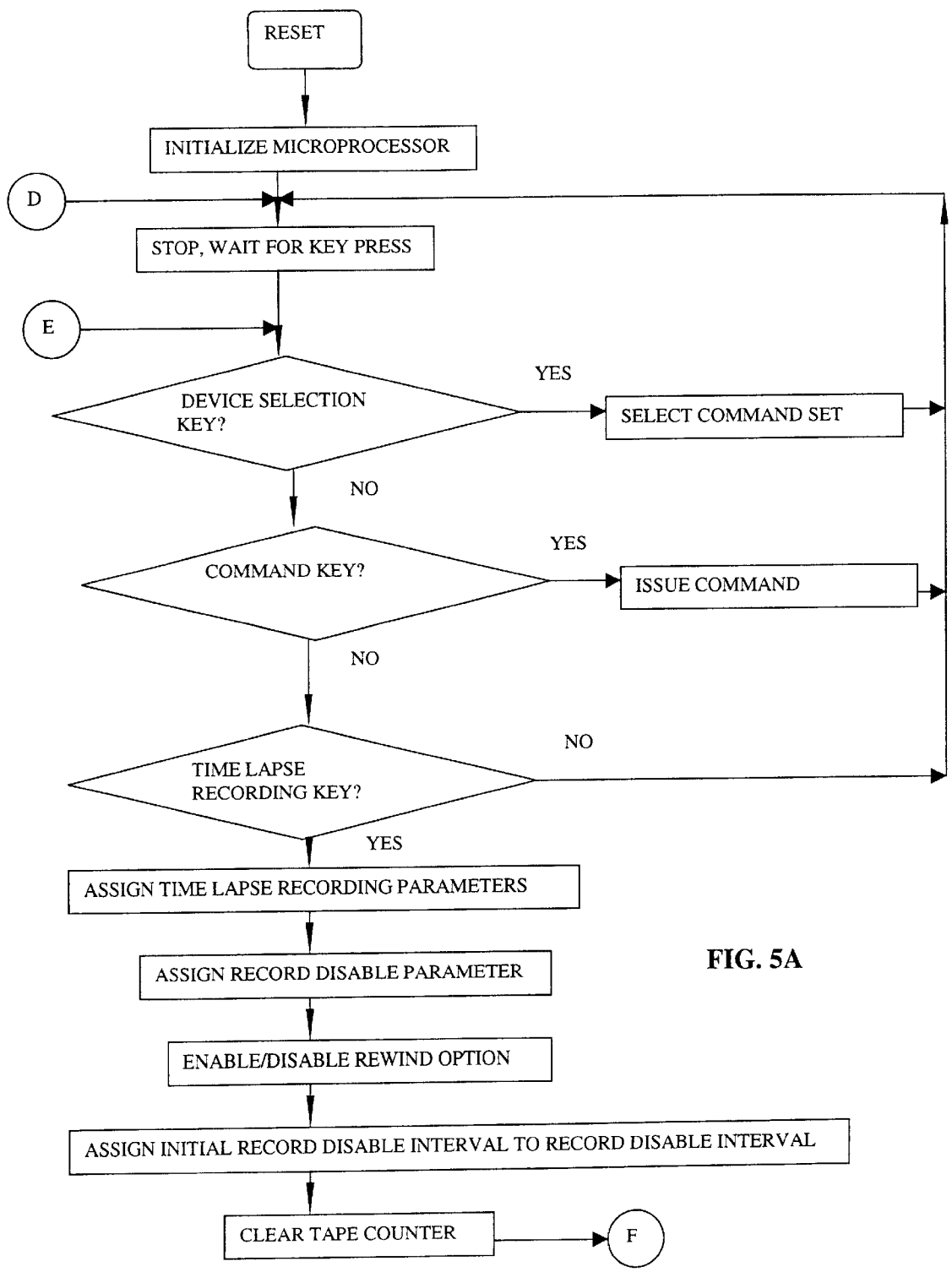

FIG. 5A is the same as previously described FIG. 4A up until the step of assigning the record disable parameters. In this step, the program assigns the initial record disable interval, the repeated record enable interval, and the repeated record disable interval to memory locations or registers within the microprocessor 28. The operator through the keypad assigns the value of these parameters. The initial record disable interval determines the amount of initial delay before any recording is allowed. The repeated record enable interval determines the amount of time recording (time lapse or normal) is allowed before being temporarily disabled. The repeated record disable interval determines the amount of time all recording is disabled before being enabled again. The purpose of the additional parameters and corresponding functions is to allow all recording to be disabled when it is known that an event of interest will not occur during this period or when conditions do not allow recording. For example, if there were no artificial light available, it would be a waste of recording tape to record during nighttime hours. In this case, the repeated record enable interval should be approximately 12 hours (daylight) and the repeated record disable interval should be approximately 12 hours (nighttime). Also, if the recording system is set up for example at 10 PM and daylight does not occur until 6 AM, the initial record disable interval should be set for 8 hours. Of course while recording, the time lapse techniques described above can be employed. Assigning 0 to the initial record disable interval, the repeated record disable interval, and the repeated record enable timer causes the program to not disable all recording for periods of time. This would cause the program to run in a fashion similar to the program in FIG. 4A and 4B. After assigning the record disable parameters, the program determines if the operator wishes to have the recording tape rewound when the end of the tape has been detected. This would allow the recording to continue after the end of the tape has been reached at the expense of overwriting previous recordings.

Figure 5B:
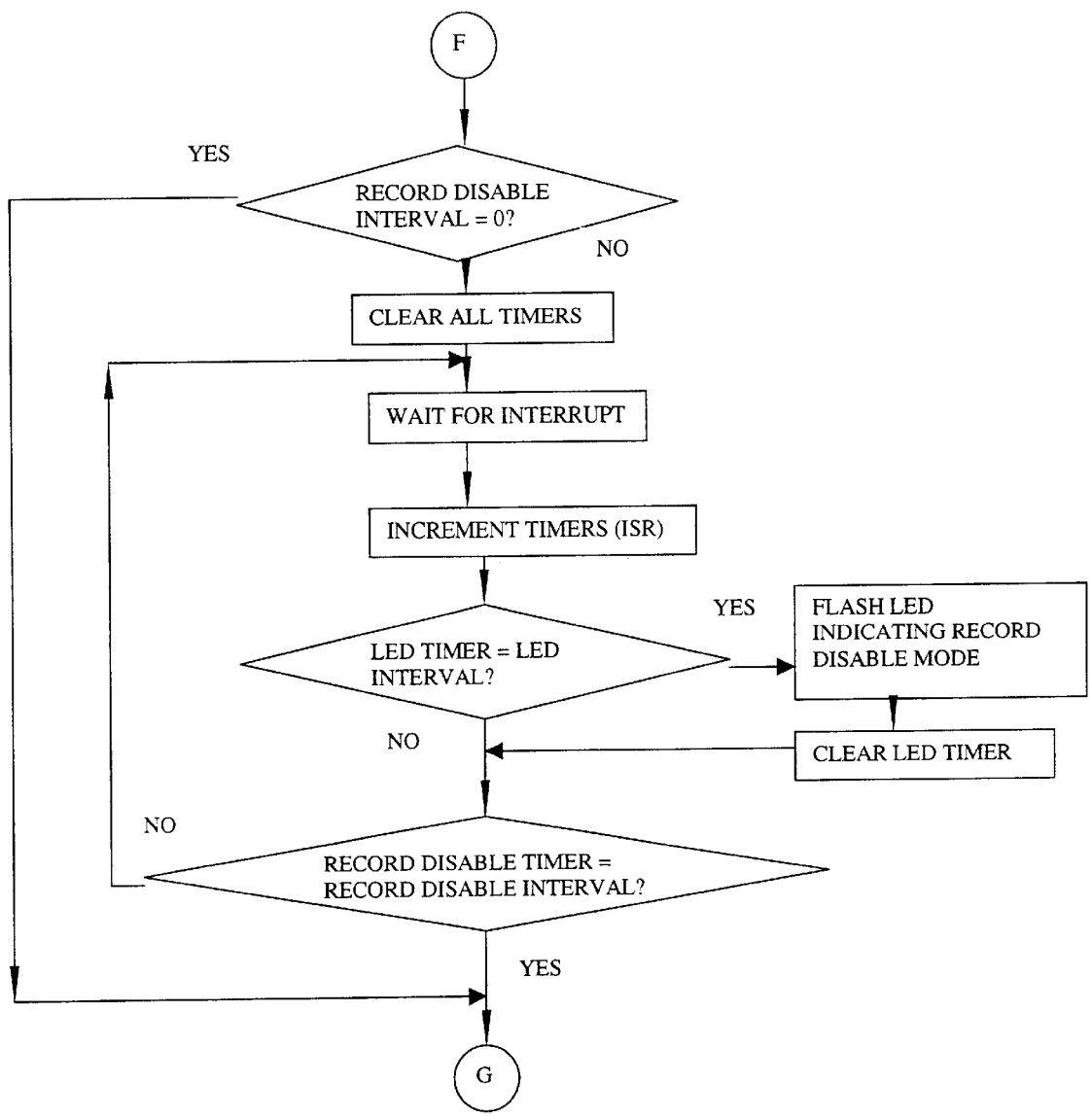
Figure 5C:
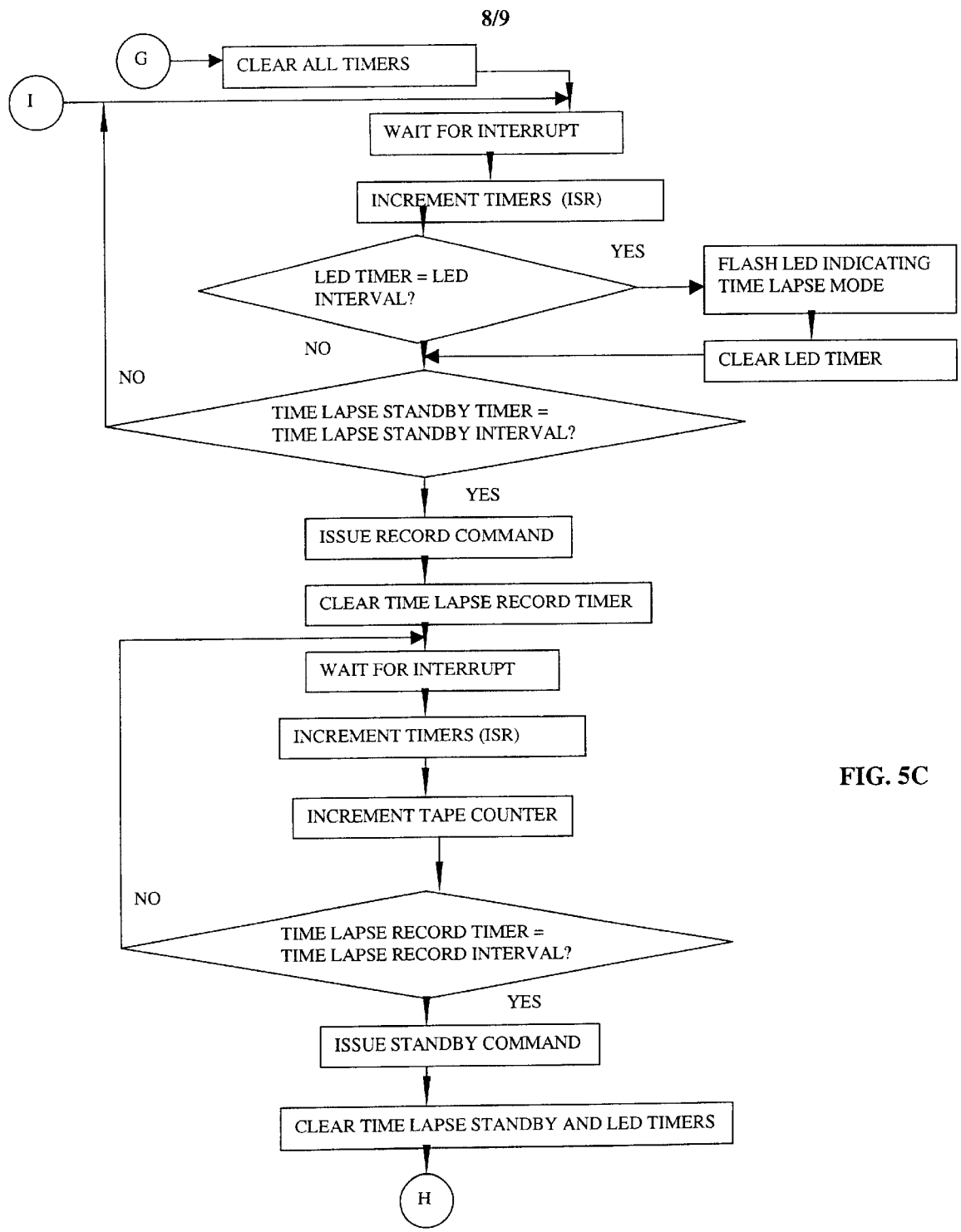

The program then assigns the initial record disable interval to a register called the record disable interval register. The record disable register is assigned the initial record disable interval or the repeated record disable interval depending on whether the record disable interval is initial or repeated. In this way, the record disable routine is shared between initially disabling recording and repeatedly disabling recording. The tape counter register is then cleared. The tape counter register monitors the amount of recording tape used. The program then goes to the record disable routine in FIG. 5B. The program then checks to see if the record disable interval is zero. If it is, the record disable routine in FIG. 5B is skipped and time lapse recording begins in FIG. 5C. If the initial record disable interval is not zero, all timers are cleared and the program instructs the microprocessor 28 to enter a low power wait mode. When an internal timer interrupt occurs, the microprocessor 28 emerges for the low power wait mode and the timer registers are incremented. The program checks to see if the visual LED timer is equal to the visual LED interval. If it is, the visual LED is flashed in such a way to indicate to the operator that the program is running a record disable routine where no recording is taking place. The program then clears the LED timer. If the LED timer register is not equal to the LED interval, the LED flashing routine is skipped. The program then checks to see if the record disable timer is equal to the record disable interval. If it is, the record disable routine is exited and the time lapse routine in FIG. 5C is entered. If the record disable timer is not equal to the record disable interval, the program stays within the record disable routine and instructs the microprocessor 28 to enter the low power wait mode and wait for an interval interrupt to occur. Some camcorders shut down and do not respond to infrared commands if a record command has not been received within a period of time—typically 5 minutes. If such a camcorder 20 is used, and the record disable interval is longer than 5 minutes, a dummy record command should be issued periodically during the record disable interval. The dummy record command would cause the camcorder 20 to record for a minimal amount of time and would prevent the camcorder 20 from shutting down. As an example, a dummy record command could be issued every 4 minutes and the duration of the recording would be 0.5 seconds.

After completing the record disable routine in FIG. 5B, the program then enters the time lapse routine illustrated in FIG. 5C. The time lapse routine illustrated in FIG. 5C is the same as the already described time lapse routine illustrated in FIG. 4B except that there is included a provision for monitoring the amount of recording tape used. While the camcorder 20 is recording, the program increments a register called tape counter in FIG. 5C. This register is not cleared each time a record command is issued, as is the time lapse record timer register. In this way, the tape counter register indicates the total time the camcorder 20 was recording, and therefore the amount of recording tape used.

Figure 5D:
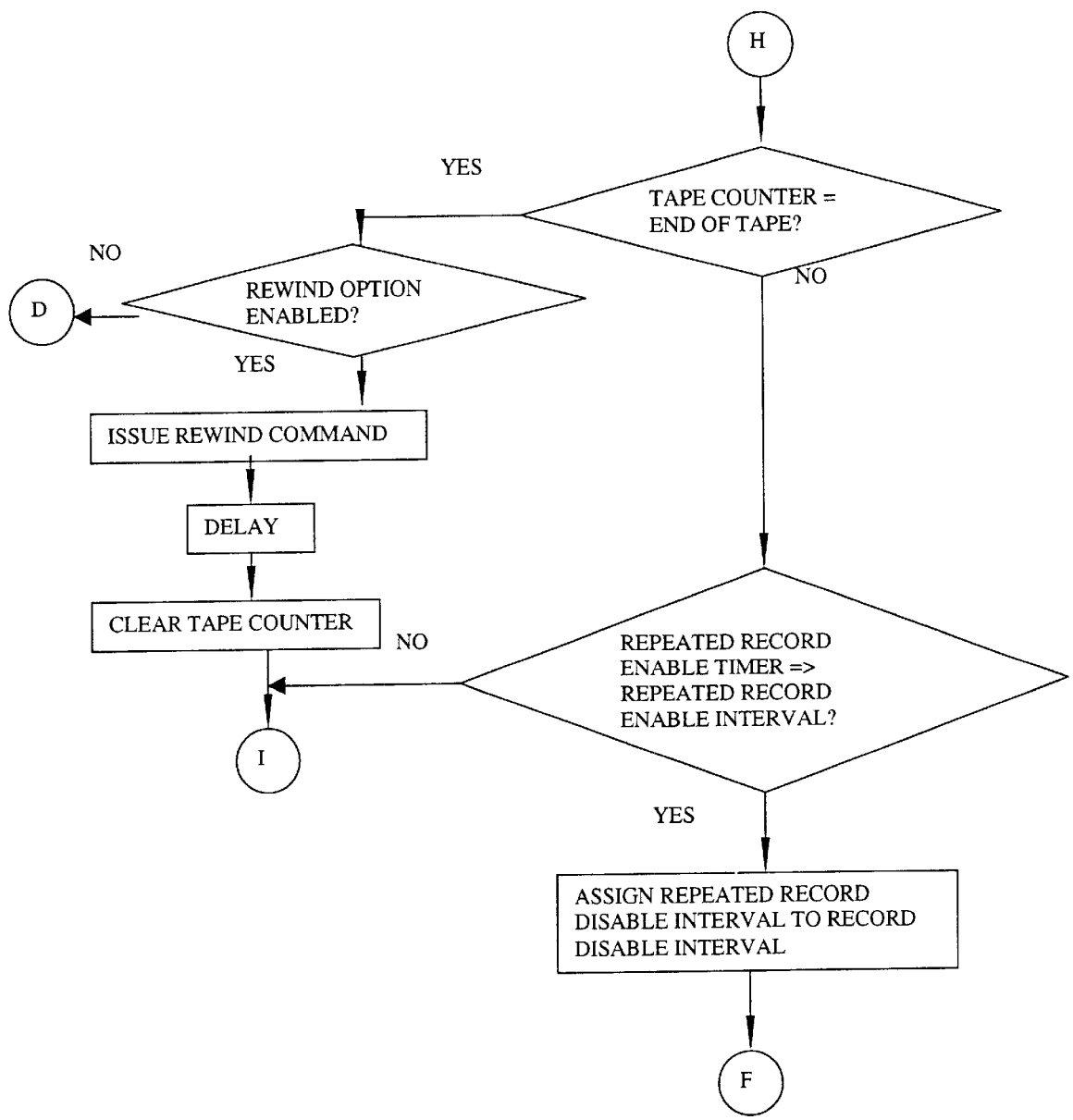

Still referring to FIG. 5C, after each time lapse record interval, the program issues a standby command, clears the time lapse standby and LED timers, and proceeds to FIG. 5D. The value contained in the tape counter register is checked to see if the end of the recording tape has been reached. If it has, the program checks to see if the rewind option has been enabled. If the rewind option has not been enabled, the program essentially terminates by instructing the microprocessor 28 to enter the stop mode and await a key press. This is because the recording tape has reached the end and commanding the camcorder 20 to record further would be useless. Continuing to issue record commands after the recording tape has reached its end as is done in the program in FIG. 4A and FIG. 4B is not harmful to the camcorder 20, but would unnecessarily consume power from the remote control battery. If the rewind option has been enabled, a rewind command is issued. The program then delays long enough for the camcorder 20 to complete rewinding, and clears the tape counter register. The program then goes back to the beginning of the time lapse routine in FIG. 5C. If the end of the recording tape has not been detected, the program checks if the repeated record enable timer is greater than or equal to the repeated record enable interval. If it is not, the program goes back to the beginning of the time lapse routine in FIG. 5C. If the repeated record enable timer is greater than or equal to the repeated record enable interval, the repeated record disable interval is assigned to the record disable interval register. The program then enters the record disable routine illustrated in FIG. 5B. Note that if the repeated record disable interval was assigned 0 in FIG. 5A, the record disable routine in FIG. 5B is skipped.

To summarize, the program in FIGS. 5A, 5B, 5C, and 5D causes the camcorder 20 to record in a time lapse fashion after first waiting a period of time equal to the initial record disable interval. While time lapse recording, the time length of the video samples is equal to the time lapse record interval and time between video samples is equal to the time lapse standby interval. The camcorder 20 records in a time lapse fashion for a period of time equal to the repeated record enable interval and then stops time lapse recording. After a period of time equal to the repeated record disable interval, the camcorder 20 begins recording in a time lapse fashion again. The camcorder 20 alternates between recording in a time lapse fashion during the repeated record enable interval and not recording at all during the repeated record disable interval until the value of the tape counter register indicates that the end of the recording tape has been reached. If the rewind option has been enabled, the recording tape is then rewound. After rewinding, alternating between time lapse recording and not recording is continued.

An example of a situation where all the features of the program in FIGS. 5A, 5B, 5C, and 5D might be utilized follows. A police officer may wish to record an act of vandalism such as graffiti marking. A certain location is vandalized about once a week between the hours of 10 PM and 6 AM. The location has enough artificial light to make video recording useful during these hours. A cooperative merchant or homeowner agrees to let the officer set up the video recording system in a window that has a view of the location of interest. Because AC power is available and the event is on the other side of a window, the video recording system in FIG. 1 would be used. The remote control 30 would contain the program illustrated in FIGS. 5A, 5B, 5C, and 5D. The location can be a significant distance from the window because even low cost camcorders have very good quality telephoto optics. The officer sets up the system at 1 PM, but recording should not start until 10 PM so the initial record disable interval is set to 9 hours. The recording should only occur between 10 PM and 6 AM so the repeated record enable interval should be 8 hours. All recording should be disabled between 6 AM and 10 PM so the repeated record disable interval is 16 hours. The vandalism is estimated to take a minimum of 20 seconds to complete, so to ensure that at least a portion of the vandalism is recorded, the time lapse standby interval is set to 9 seconds. For this situation, the video samples can essentially be snapshots so the sample time can be quite short—1 second in this case. The time lapse record interval is then set to 1 second. The combination of the time lapse standby interval being 9 seconds and the time lapse record interval being 1 second yields a time compression ratio of 10:1 so a 2 hour recording tape will provide 20 hours of time lapse recording. Since each night requires 8 hours of time lapse recording, the 2 hour tape will provide 2.5 nights worth of recording. The officer then needs to check the location for graffiti every other day. If the camcorder 20 can be rewound by an infrared command, there would be an advantage to enable the rewind option. The rewind option would make it so the officer would not have to disturb the resident or merchant every other day to manually rewind the camcorder 20 if the vandalism did not occur within 2 days.

Conclusion, Raifications, and Scope

Thus the reader will see the remote control of the invention provides an inexpensive, compact means of extending the recording time of a standard video-recording device such as a camcorder. In doing so, the benefits of a mass-produced product can be applied where previously specialized equipment would be necessary—such as time lapse video cassette recorders. Among the advantages are:

It is much less expensive.

It is much more self-contained and portable.

It takes advantage of new advances in recording technology that are generally incorporated into mass-produced consumer products first.

Among the advantages the present invention has over prior art attempts to extend the recording time of a standard recording device:

It can be used with camcorders.

Recording parameters can be varied easily.

It is not confined to events that can be detected by a motion detector.

The amount of extended recording time is predictable.

It is more compact.

It can act as a general-purpose remote control.

Although the benefits of the present invention are most apparent when used in conjunction with a camcorder, other recording devices that are capable of being remotely controlled can also benefit. This would include devices such as videocassette recorders, and audio recorders. Also remote control devices that signal through the use of a media other than infrared such as radio frequency energy and other wireless media will also benefit. Also, remote controls can include devices such as computers or personal digital assistants that can transmit signals capable of remotely controlling an electronic device.

Thus the scope of the invention should be determined by the appended claims and their legal equivalents, rather than by the examples given.

Included Program

Source code program listing is included as an appendix that for the most part implements the flowchart in FIGS. 5A, 5B, 5C, and 5D. Some exceptions are:

No tape counter is implemented.

There is no rewind option.

There are no dummy record commands during the record disable intervals.

There is no device selection. The source code is written for Sony camcorders only.

Several timers are combined into one general purpose timer. For instance, functions performed by the time lapse record timer and the time lapse standby timer in FIG. 5 are performed by the same timer in the source code. This can be done because the two functions are never performed at the same time.

Also included is a detailed electrical schematic.

Source Code Parameters:

Microprocessor—MC68HC705C8A by Motorola.

Assembler—CASM05 by P&E Microcomputer Systems Inc., Version 3.06.

Remote Control Hardware—3 device universal remote control, model #URC-3060, made by Universal Electronics.

Controlled Camcorder—Model Number CCD-FX310 by Sony Corporation.

I claim:

1. A method for extending the recording time of a remotely controllable device comprising the steps of:
   (a) wirelessly transmitting a record command to said remotely controllable device causing said remotely controllable device to record;
   (b) wirelessly transmitting a standby command after a first period of time to said remotely controllable device causing said remotely controllable device to stop recording;
   (c) wirelessly transmitting said record command after a second period of time to said remotely controllable device causing said remotely controllable device to record; and
   (d) alternating steps (b) and (c) automatically.

2. The method of claim 1, wherein said first period of time and said second period of time are chosen to cause said remotely controllable device that does not inherently record in a time lapse manner to record in a tune lapse manner.

3. The method of claim 1, wherein said first period of time and said second period of time are chosen to cause said remotely controllable device to record only when an event of interest is known to occur.

4. The method of claim 1, further comprising a step of transmitting a rewind command after an end of a recording media has been detected.

5. The method of claim 1, further comprising a step of changing said first period of time and said second period of time in response to an input from an external sensor.

6. The method of claim 1, wherein said remotely controllable device is powered by a battery, further comprising steps of:
   (a) applying power from the battery to said remotely controllable device before transmitting said record command;
   (b) removing power from the battery to said remotely controllable device after transmitting said standby command;

whereby steps (a) and (b) provide an extended life of said battery.

7. The method of claim 1, wherein said record command and said standby command consist of the same signal for toggling said remotely controllable device between a recording state and a non-recording state.

8. A method for extending the recording time of a remotely controllable device that does not inherently record in a time lapse manner comprising a step of:

transmitting record commands and standby commands alternately and automatically to cause said remotely controllable device to record in a time lapse manner.

9. The method of claim 8, further comprising a step of disabling all recording for periods of time when it is known that an event of interest will not occur.

10. The method of claim 9, wherein said remotely controllable device becomes unresponsive to commands during extended periods of not recording, further comprising a step of transmitting record commands and standby commands during periods of time when recording is substantially disabled to cause said remotely controllable device to remain responsive to remote commands.

11. The method of claim 8, further comprising a step of transmitting a rewind command after an end of the recording media has been detected.

12. The method of claim 8, further comprising a step of changing the amount of time between the record commands and standby commands thereby changing the time lapse time compression in response to an input from an external sensor.

13. The method of claim 8, wherein said remotely controllable device is powered by a battery, further comprising steps of:
   (a) applying power from the battery to the remotely controllable device before transmitting said record commands;
   (b) removing power from the battery to the remotely controllable device after transmitting said standby commands;

whereby battery life of said battery is extended.

14. The method of claim 8, further comprising a step of synchronizing the transmission of said record commands and standby commands to a periodic event.

15. An apparatus for extending the recording time of a remotely controllable device comprising:

means for wirelessly transmitting a record command and a standby command, said record command for causing said remotely controllable device to record and said standby command for causing said remotely controllable device to stop recording; and means for automatically alternating the transmission of said record command and said standby command.

16. The apparatus of claim 15, wherein said remotely controllable device does not inherently have the capability of time lapse recording, further comprising a means of timing the transmission of said record command and said standby command such that said remotely controllable device has the capability of time lapse recording.

17. The apparatus of claim 15, wherein said remotely controllable device is powered by a battery, further comprising a means of applying and removing power from the battery for extending the life of said battery.

* * * * *